United States Patent

[11] 3,572,469

[72] Inventors John F. Miller
    Charlotte, N.C.;
    George R. Ferguson, Clover, S.C.
[21] Appl. No. 782,958
[22] Filed Dec. 11, 1968
[45] Patented Mar. 30, 1971
[73] Assignee G. W. Murphy Industries, Inc.
    Houston, Tex.

[54] AIR LINE LUBRICATING DEVICE
    11 Claims, 3 Drawing Figs.
[52] U.S. Cl. .................................................. 184/55
[51] Int. Cl. .................................................. F16n 7/34
[50] Field of Search .................................... 184/55, 55
    (A), 56, 56 (A)

[56] References Cited
    UNITED STATES PATENTS
    2,459,398  1/1949  Walters ........................ 184/55
    2,776,025  1/1957  Schweisthal .................. 184/55
    2,897,919  8/1959  Dellner ......................... 184/55
    3,064,760  11/1962 Shada ........................... 184/55
    3,135,356  6/1964  Pons ............................. 184/55

Primary Examiner—Manuel A. Antonakas
Attorneys—J. Vincent Martin, Joe E. Edwards and Jack R. Springgate ABSTRACT: A combined lubricator, filter and pressure regulator device having a body with an inlet and an outlet, a filter in the body in communication with the inlet, a valve, a pressure-responsive means connected to the valve, the valve being mounted within the body to control flow from the filter to the outlet and a lubricating fluid injector in the body between the filter and the outlet.

Patented March 30, 1971

John F. Miller
George R. Ferguson
INVENTORS

BY
ATTORNEYS

Patented March 30, 1971

John F. Miller
George R. Ferguson
INVENTORS

BY
ATTORNEYS

AIR LINE LUBRICATING DEVICE

SUMMARY

The present invention relates to an improved fluid device to be used on a fluid line to filter the fluid, regulate the fluid pressure and to add a lubricant to the fluid.

An object of the present invention is to provide an improved fluid apparatus for filtering, pressure regulating and lubricating which is compact and has no piping between components.

Another object is to provide an improved fluid filter, pressure regulator, lubricator device which compensates for the normal pressure drop experienced on initial opening of a pressure regulator.

Still another object is to provide an improved apparatus of the type described in which the oil reservoir which surrounds the housing is exposed to pressure by may be readily depressurized to refill the reservoir.

A still further object is to provide a fluid device for filtering, pressure regulating and lubricating fluid flowing therethrough in which the amount of lubricant added to the fluid is in a substantially constant volume ratio over wide ranges of fluid flow.

BRIEF DESCRIPTION OF THE DRAWING

These and other objects and advantages of the present invention are hereinafter set forth and explained with reference to the drawings wherein.

DESCRIPTION OF THE PREFERRED EMBODIMENT

Figure 1:
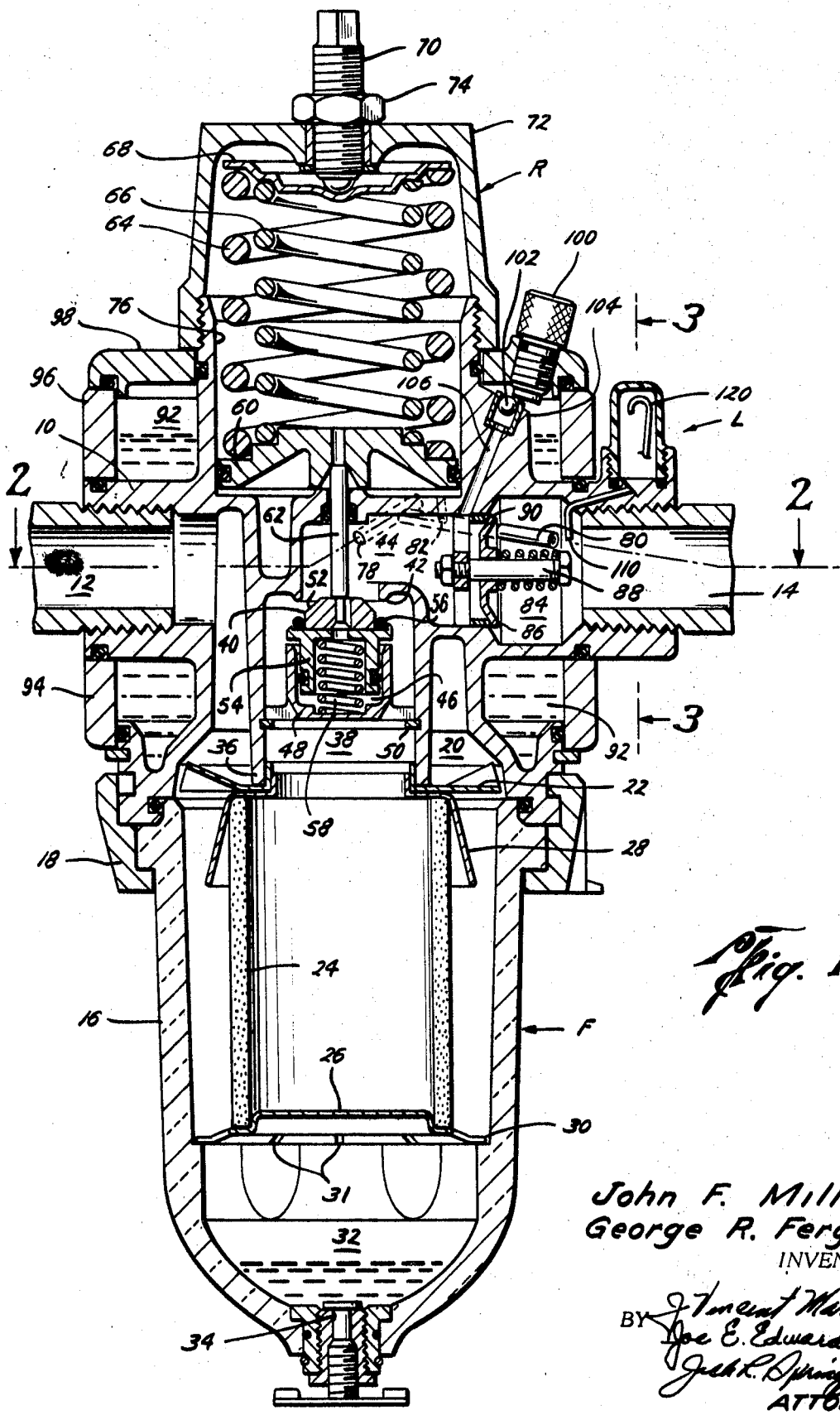
FIG. 1 is a cross-sectional view of the apparatus of the present invention.
Figure 2:
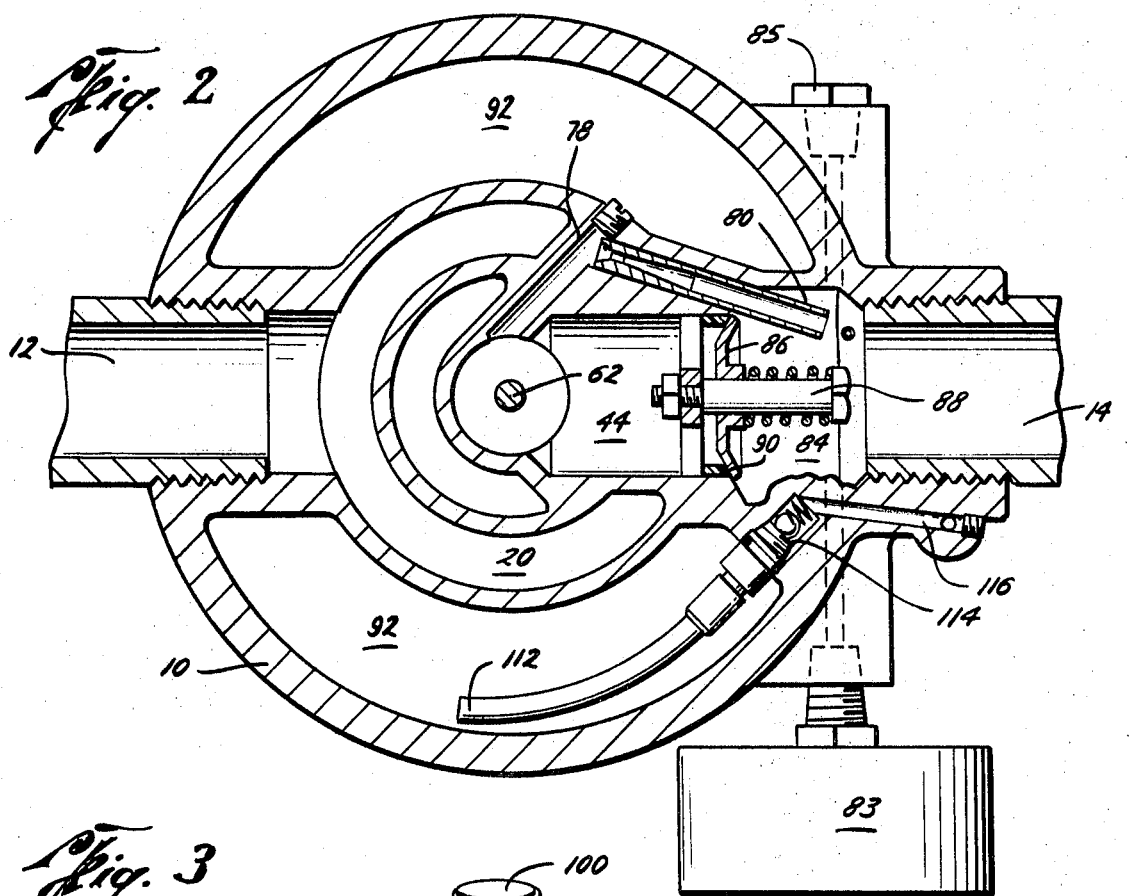
FIG. 2 is a sectional view taken along line 2–2 in FIG. 1.
Figure 3:
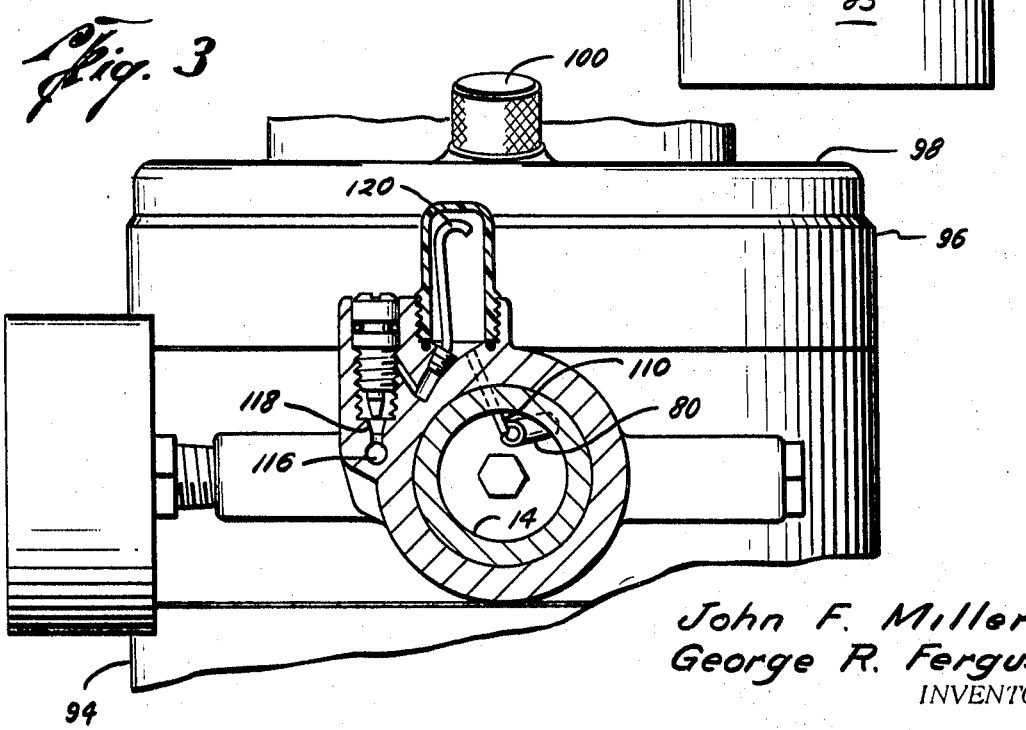
FIG. 3 is a sectional view taken along line 3–3 in FIG. 1.

The combination filtering, pressure regulating and lubricating device of the present invention as illustrated in the drawings includes the body 10 through which fluid such as air is to flow and the filtering section F, the pressure regulating section P and the lubricating section L. The body 10 defines the inlet 12 which communicates with the filtering section F and the outlet 14.

FILTERING

The filtering section F is formed by the body 10 and the bowl 16 which is secured to the body 10 by the nut 18. Air flowing into the device flows through the inlet 12, the annular chamber 20 and past the vanes 22 and through the filter 24. Tubular filter 24 is supported in bowl 16 between plate 26 and cap 28 and the outer periphery of cap 28 extends downwardly around the upper end of tubular filter 24 to direct the airflow downwardly in the bowl 16 around the filter 24. The vanes 22 are positioned to cause the air to flow around the interior of the bowl 16 as it flows downwardly around filter 24. The plate 26 is supported on the shoulders 30 on the interior of bowl 16 and plate 26 has a plurality of slots 31 to allow any solid particles and liquid separated from the air flowing through filter section F to drain into the lower or sump portion 32 of bowl 16. Liquid and solids collecting in sump 32 may be discharged through the drain valve 34. Vanes 22 and cap 28 are pressed into engagement within projection 36.

The function of the filtering section F is to remove liquid and solid particles from the air flowing therethrough. In addition to the solid particles and liquid removed by the filter 24, the swirling flow of the air induced by the vanes 22 causes solids and liquids to be thrown outwardly causing the solid particles and liquids to collect on the interior surface of bowl 16 and drain through slots 31 into sump 32. Also, the change of direction of the airflow caused by cap 28 further aids in separating solids and liquids from the airflow. The configuration of the filtering section F has the advantage that the filter 24 may be easily and quickly replaced whenever the device is not under pressure. Bowl 16 is released from body 10 by actuation of nut 18. When the bowl 16 is lowered, filter 24 and plate 26 are removed therewith. By replacing the filter 24, the connection of bowl 16 to body 10 by nut 18 clamps the filter 24 between cap 28 and plate 26.

PRESSURE REGULATING

The interior of annular projection 36 defines the passageway 38 through which air flows to the pressure regulating valve 40. The valve 40 coacts with the seat 42 which surrounds the communication between passageway 38 and chamber 44 to control the pressure of the air discharged from the device. Valve 40 is positioned within the chamber 46 defined by cup 48 which is supported in passageway 38 by the snap ring 50 engaging the spider portion of cup 48. The valve 40 includes the plug 52 and the follower 54 with the resilient seating ring 56 (which may be an O-ring) retained therebetween and adapted to engage seat 42 when valve 40 closes. Follower 54 is sealed within chamber 46 and is held in contact with plug 52 by spring 58. Chamber 46 is exposed to the air pressure from chamber 44 through suitable porting in plug 52 and follower 54. The diameter at which follower 54 seals against the walls of chamber 46 is substantially the same as the diameter of the seating of ring 56 on seat 42. Thus the pressure across valve 40 is balanced to prevent variations in upstream pressure from causing variations in the regulated downstream pressure.

Pressure regulating valve 40 is actuated responsive to pressure by a suitable pressure responsive means such as the piston 60. Stem 62 connects valve 40 to the piston 60. The piston 60 is biased in a direction tending to open valve 40 by the springs 64 and 66. These springs 64 and 66 coact between the upper side of piston 60 and the lower side of plate 68. The position of plate 68 is adjustable and thus forces exerted on piston 60 by springs 64 and 66 may be preselected by the positioning of plate 68. This adjustment is provided by the screw 70 which threads through cap 72 and engages plate 68. Lock nut 74 is provided on screw 70 to retain it in its preselected position. Generally a handle (not shown) is secured to the outer end of screw 70 to make turning of the screw 70 easier.

Piston 60 is positioned within cylinder 76 which is defined by body 10. Cap 72 closes the outer end of cylinder 76. To deliver downstream pressure to the underside of piston 60 in cylinder 76, passage 78 communicates from chamber 44 to the inner end of venturi tube 80 and port 82 communicates between cylinder 76 and the interior of tube 80 at a position immediately downstream of the throat of the venturi in tube 80. Venturi tube 80 extends from its connection to passage 78 to the chamber 84 downstream of the back pressure valve 86. Thus, the pressure delivered to cylinder 76 is slightly less than the pressure in chamber 84 to provide compensation for the usual pressure drop experienced by regulators as they open initially and the pressure drop of flow through the lubricator. Back pressure valve 86 is slidably mounted on stem 88 and is biased toward engagement with seat 90 whenever flow stops between chamber 44 and chamber 84.

With piston 60 being exposed to the downstream pressure, the pressure regulation of air flowing through the device is preselected to provide the desired outlet pressure. When the pressure in chamber 84 drops below the preselected outlet pressure, the pressure in cylinder 76 under piston 60 also falls. The reduction of pressure under piston 60 creates an unbalance of forces with the spring forces being greater than the pressure force to move piston 60 downwardly, thereby moving valve 40 further from sat 42. This allows a greater flow through the device to cause the pressure in chamber 84 to be increased to its preselected level. When the pressure in chamber 84 has returned to normal this pressure is transmitted to cylinder 76 causing piston 60 to move upwardly thereby imparting a closing movement to valve 40. A higher than desired pressure in chamber 84 moves the piston 60 upwardly because the pressure force on piston 60 would be greater than the spring forces to thereby cause valve 40 to move closer to seat 42. This restriction of the flow through the seat 42 results in a pressure reduction in chamber 84. The reduction in pressure is communicated to the piston 60 and when the pressure reaches the preselected downstream pressure the piston 60 assumes its desired balanced position. As stated the desired downstream pressure is preselected by the setting of adjusting screw 70 which determines the forces exerted by the springs 64 and 66 on the piston 60. The pressure gauge 83 connects into chamber 84 as shown to indicate the pressure in chamber 84. Opposite sides of the body 10 are ported into chamber 84 to allow the pressure gauge to be positioned on either side of body 10. The plug 85 is connected into the opposite port from the gauge 83. This alternate mounting of gauge 83 allows the device of the present invention to be mounted against a wall with the inlet 12 being on either side to accommodate the right-to-left or left-to-right piping as may be desired.

LUBRICATING

Lubrication is provided in air lines usually when the air is being used to power air actuated tools. A fine spray of oil carried by the air line lubricates such air actuated tools. It is desired, however, to provide a relatively constant ratio of oil to air independent of the rate of flow of the air.

The lubrication system L includes an oil reservoir 92 and a means of introducing oil from the reservoir in metered amounts into the air being discharged from the device. The reservoir 92 is formed by the body 10 and means coacting with the body 10. Such means includes the annular rings 94 and 96 and the annular cover 98. The rings 94 and 96 and the cover 98 are suitably held in place and sealed with respect to the body 10 to define the reservoir 92 generally surrounding the central portion of the combined filtering, pressure regulating and lubricating device.

The oil in reservoir 92 may be replenished while air is flowing through the device. The fill plug 100 which is threaded through cover 98 engages and depresses ball check valve 102 when plug 100 is in its innermost position. The holding of ball valve 102 off its seat 104 allows the reservoir 92 to be under pressure supplied from chamber 44 through passage 106 and seat 104 at the upper end of passage 106. When plug 100 is retracted, the pressure in reservoir 92 is vented and the rush of air past ball valve 102 causes ball valve 102 to engage seat 104 shutting off the flow of air to reservoir 92. With plug 100 removed and ball valve 102 seated, the reservoir 92 is refilled. Reservoir 92 is filled only to a level below seat 104 and then plug 100 is installed. When plug 100 moves ball valve 102 off seat 104 the reservoir 92 is pressurized with air from chamber 44.

In order to introduce oil into the air flowing through outlet 14, a means is provided for conducting oil from the reservoir 92 to the discharge nozzle 110. Such means should include a suitable control means for varying the amount of oil flowing. The oil flows from the reservoir through the tube 112, the check valve 114, the passage 116, the tapered passage 118, the drip tube 120 and the nozzle into chamber 84 at a point in alignment with the axis of tube 80. Tube 112 extends down into the lower portion of reservoir 92 so that substantially all of the oil in reservoir 92 may be used for lubrication. Control of the oil flow is achieved by the positioning of metering valve 122. Metering valve 122 is adjustable from the exterior of body 10 and also has the outer apex of its threads which engage mating threads in body 10 removed or flattened to provide a passageway for oil flow to drip tube 120. Control of the amount of oil flowing is provided by the position of valve 122. Varying the position of valve 122 varies the length of travel of the oil in the threads and the passageway size. The frustoconical projection 123 on valve 122 is used to engage tapered passage 118 to positive shutoff of the flow of oil. Cover 124 surrounding drip tube 120 is preferred to be transparent so that the oil flow may be checked visually.

In order to assure that oil does not continue to flow when airflow is stopped, the check valve 114 is spring-loaded to shut off oil flow whenever the pressure differential moving the oil falls to a level at which it does not hold check valve 114 open. With the reservoir 92 under pressure from the chamber 44, the oil flows through the lubricating system as described so long as the pressure in chamber 44 exceeds the pressure in chamber 84. Whenever these two pressures equalize, the oil will stop flowing. Under conditions of very low flow rates, the spring force urging back pressure valve 86 toward closed position may be sufficient to hold valve 86 on seat 90 and in such circumstances all of the airflow is through the bypass defined by passage 78 and tube 80. Thus, with such low flow rates, all of the flow is discharged from tube 80 at nozzle 110 to assure that a drop of oil from nozzle 110 will be atomized as it flows through outlet 14. Whenever the pressure in chamber 84 is the same or larger than the pressure in chamber 44, valve 86 is closed and the pressure is conducted to cylinder 76 to move piston 60 upwardly closing valve 40. Reverse flow of oil in the lubricating system is prevented by the check valve 114 which closes whenever flow therethrough stops.

At low flow rates the quantity of oil flowing will be determined by the position of metering valve 122 and also the pressure differential between chamber 44 and chamber 84, that is, the pressure on the oil in reservoir 92 urging the oil to flow and the pressure in chamber 84 resisting the movement of the oil. When the flow through the device is very low, the pressure difference moving oil through the lubrication system is commensurately low. For this reason the amount of oil injected in relation to the volume of air remains substantially constant over wide ranges of flow. For example, on a device having a 1-inch flow line connection the oil flow begins at approximately 2 standard cubic feet per minute, increases with flow linearly up to about 100 standard cubic feet per minute and then remains about constant at higher flows. This provides a substantially constant flow ratio of the oil to the air to assure proper lubrication at all flow rates.

From the foregoing it can be seen that the improved device of the present invention provides a compact unit for the complete treatment of air in an air system in which the air is filtered, its pressure is controlled to a preselected pressure and oil is added to the air flowing therethrough in preselected quantities. Further, the pressure-regulating portion of the device has compensation for the usual pressure drop experienced on initial opening due to the high velocity of the fluid flowing between the plug and the seat and the pressure drop of the air passing through the lubricator since the sensed pressure is downstream of the back pressure valve. The oil reservoir of the present invention is so situated that it may be filled while the unit is under pressure and flooding of the flow lines with oil when the fluid flow is shut off is prevented. The unit is compact, may be hooked up for right-to-left or left-to-right flow and the controlled downstream pressure is not affected by fluctuations in upstream pressure.

The foregoing disclosure and description of the invention are illustrative and explanatory thereof, and various changes in the size, shape and materials, as well as in the details of the illustrated construction, may be made within the scope of the appended claims without departing from the spirit of the invention.

We claim:
1. A fluid device, comprising:
a body having an inlet and an outlet;
means positioned in the communication between said inlet and said outlet for filtering the fluid flowing therethrough;
a valve seat surrounding said communication between said inlet and said outlet;
a valve member mounted to control the flow of fluid through said valve seat;
a pressure-responsive member connected to said valve member to position said valve member with respect to said valve seat;
a back pressure valve positioned in said communication downstream of said valve seat;
means for conducting pressure of fluid downstream of said back pressure valve to said pressure-responsive member whereby said valve member controls the pressure downstream of said back pressure valve;

means coacting with said body to define an oil reservoir; and means for injecting oil into the fluid flowing through said body downstream of said filtering means in an amount substantially proportional to the flow of fluid.

2. A fluid device according to claim 1 including:

a bypass passage communicating between a position downstream of said valve seat to a position downstream of said back pressure valve; and said oil being injected into the fluid at a position downstream of said back pressure valve and in alignment with said bypass passage whereby flow through said passage entrains the oil injected therein.

3. A fluid device according to claim 2 including:

a venturi section in said bypass passage; and said fluid-pressure-conducting means connecting into said bypass passage immediately downstream of the throat of said venturi section whereby the lower pressure in said venturi is delivered to said pressure-responsive member to compensate for initial drop of regulated pressure as said valve member opens flow through said valve seat.

4. A fluid device according to claim 1 including means for balancing pressures across said valve member whereby the regulated downstream pressure is independent of fluctuations in fluid pressure upstream of said valve member.

5. A fluid device, comprising:

a body having an inlet and an outlet;

a valve seat surrounding said communication between said inlet and said outlet;

a valve member mounted to control the flow of fluid through said valve seat;

a pressure-responsive member connected to said valve member to position said valve member with respect to said valve seat;

a back pressure valve positioned in said communication downstream of said valve seat;

means for conducting pressure of fluid downstream of said back pressure valve to said pressure-responsive member whereby said valve member controls the pressure downstream of said back pressure valve;

means coacting with said body to define an oil reservoir;

means for conducting oil from said oil reservoir to said outlet to lubricate the fluid leaving said device through said outlet;

means for controlling the amount of oil flowing through said conducting means; and a check valve in said conducting means to prevent reverse flow of oil therein.

6. A fluid deice according to claim 5 including a drip sight connected in said conducting means to see the amount of oil flowing through said conducting means.

7. A fluid device according to claim 5 including:

means for conducting fluid pressure from a position immediately downstream of said valve seat to said oil reservoir;

a check valve in said fluid pressure conducting means;

said check valve in closed position preventing flow of fluid to said oil reservoir; and a plug connecting into said oil reservoir and engaging said check valve to hold said check valve in open position when said plug is in position closing said oil reservoir and allowing said check valve to close to shut off the supply of fluid pressure when said plug is removed from said reservoir.

8. A fluid device according to claim 5 wherein said oil flow controlling means includes:

a metering valve threadedly engaging in said body;

a portion of the apex of the threads of said valve being removed to define a helical flow passage between the male and female threads; and the positioning of said valve in said body determining the restriction to flow through said controlling means.

9. A fluid device according to claim 8 wherein said oil-flow-controlling means also includes shutoff means associated with said metering valve to coact with a passage in said body to positively close said passage.

10. A combination filtering, pressure-regulating and lubricating device, comprising:

a body having an inlet and an outlet;

a bowl secured to said body;

a filter positioned in said bowl;

said inlet being in communication with one side of said filter whereby all of the flow entering said inlet is conducted into said bowl;

said body defining a passage communicating from the other side of said filter;

a first valve seat surrounding said passage;

a valve member mounted for movement toward and away from said first valve seat;

pressure-responsive means connected to said valve member for moving said valve member;

a second valve seat downstream of said first valve seat;

a back pressure valve mounted for movement with respect to said second valve seat to restrict the flow therethrough;

means for urging said back pressure valve toward engagement with said second valve seat;

the discharge side of said second valve seat communicating with said outlet;

means for conducting pressure of air from the discharge side of said second valve seat to said pressure-responsive means whereby said valve member is positioned with respect to said first valve seat to control the air pressure at said outlet;

means coacting with said body to define an oil reservoir; and means for discharging oil in air flowing through said outlet in an amount proportional to pressure differential across said back pressure valve whereby oil flows in proportion to the flow of air.

11. A device according to claim 8 including:

a bypass passage communicating from a position between said valve seats to a position downstream of said second valve seat; and a venturi section in said bypass;

said pressure conducting means including a communication between said pressure responsive means and the interior of said venturi section near the throat of said venturi section.